Figure 1:
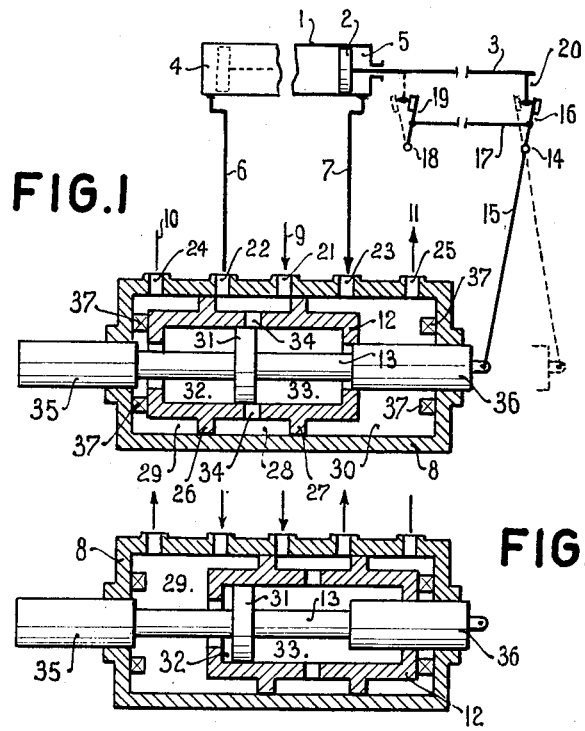

June 5, 1956 — L. H. BAGHUIS — 2,748,752
AUTOMATICALLY REVERSING VALVES

Filed April 11, 1952 — 2 Sheets-Sheet 1

Inventor
Ludovicus Hendrikus Baghuis
by
Stevens, Davis, Miller & Mosher
his attorneys June 5, 1956  L. H. BAGHUIS  2,748,752
AUTOMATICALLY REVERSING VALVES
Filed April 11, 1952  2 Sheets-Sheet 2

Inventor
Ludovicus Hendrikus Baghuis
by
Stevens, Davis, Miller & Mosher
his attorneys United States Patent Office 2,748,752
Patented June 5, 1956

2,748,752

AUTOMATICALLY REVERSING VALVES

Ludovicus Hendrikus Baghuis, Best, Netherlands

Application April 11, 1952, Serial No. 281,769

4 Claims. (Cl. 121—157)

The invention relates to a valve device for automatically reversing the supply and the discharge of pressure fluid respectively to and from the working spaces of a double-acting cylinder containing a reciprocating piston, comprising a stationary housing, ports for the admission and the exhaust of fluid to and from said housing, a free valve body contained in said housing and cooperating with said ports, said valve body being arranged for reciprocation between two end positions by the action of said fluid, and a movable member adapted to be adjusted by said piston and capable to control the fluid acting on said valve body.

The invention has for its object the provision of a reversing valve device of the type referred to, in which the dead movement of the piston at the ends of its stroke and necessary for the operation of the reversing valve is completely avoided without the use of a complicated device including members operating with snap action. The invention has to be seen in the provision of two separate chambers being enclosed by said valve body and said control member and of ports opening in said chambers, said ports alternately connecting said chambers to the fluid inlet and the fluid outlet passages and said chambers varying their volumes, so that the volume of one chamber increases and the volume of the other decreases and vice versa, when the valve body and the control member are moved with respect to one another.

An advantage of the valve device constructed in accordance with the invention is that the valve body and the control member are blocked in their extreme positions by the pressure of the fluid. Another advantage is that the chambers containing the fluid for driving the valve body may have relatively very small volumes, so that the loss of fluid used for the operation of the valve body may be reduced to a minimum.

According to the invention the valve device may be provided with a control member, which is housed for reciprocation within the valve body and on which a piston is mounted, for which said valve body constitutes a cylinder, whereas said piston may form a partition between the said chambers and operate as a piston valve for the control of the ports opening in said chambers.

In another embodiment of the valve device according to the invention the valve body and the control member may be mounted for rotation with respect to each other and to the housing about one and the same axis, said valve body may constitute a butterfly valve, which controls the ports for the admission and the exhaust of fluid to and from said housing, and said control member may also be formed as a butterfly valve controlling the ports opening in the said chambers.

Figure 3:
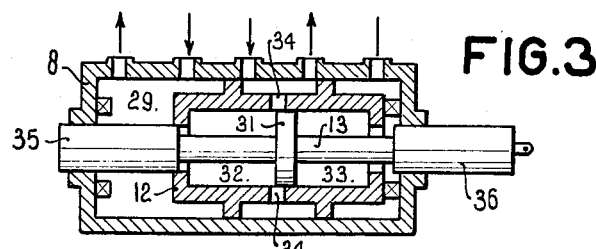
Figure 4:
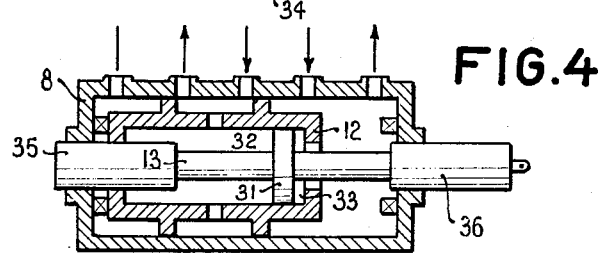
Figure 5:
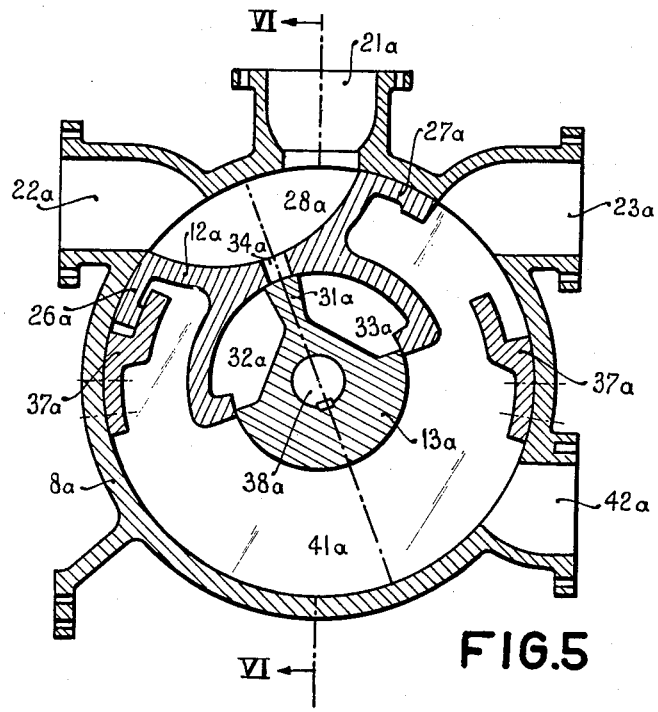
Figure 6:
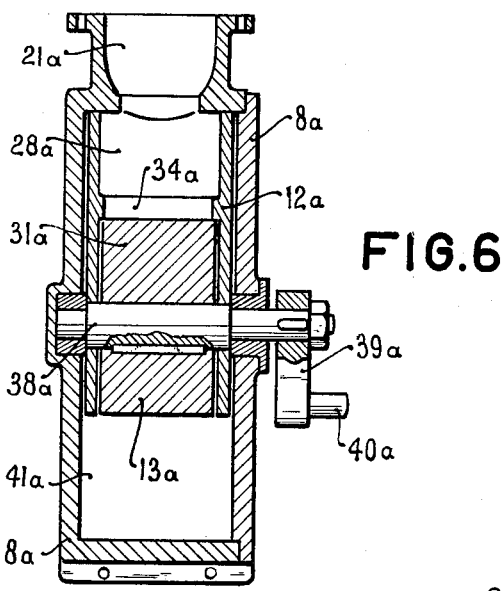

For the elucidation reference is made to the accompanying drawing which illustrates by way of example two different embodiments of the invention; in the drawing:

Figs. 1–4, inclusive, are longitudinal sectional views of a valve device having an axially movable valve body, shown in four different positions, Fig. 5 is a valve provided with a rotary valve body, and Fig. 6 is an axial sectional view on the line VI—VI in Fig. 5.

In Figs. 1–4, inclusive, 1 is a double-acting cylinder containing a reciprocating piston 2. Said piston may drive back and forth by means of a piston-rod 3 a certain machine part, for instance the slide of a grinding machine or the carriage of a planing machine. The working spaces 4 and 5 of the cylinder are connected to the housing 8 of a valve device by means of conduits 6, 7. The valve device serves to reverse the connection of the conduits 6, 7 to a fluid supply line 9 and fluid discharge lines 10 and 11. To that end the housing 8 contains an axially reciprocating valve body 12 within which an axially reciprocating control member 13 is provided. At the end of each stroke of the piston 2 the control member is placed by said piston in an end position. For that purpose said control member is coupled with a two-armed lever 15, 16 pivotally supported at 14 and connected by a rod 17 to an arm 19, which is parallel to the arm 16 and pivotally supported at 18. At the end of each stroke of the piston 2 the piston-rod 3 engages by means of an arm 20 either the lever arm 16 or the arm 19, so that the control member is positioned in either of its end positions.

The housing 8 of the valve is provided with ports 21, 22, 23, 24, 25, which communicate with the fluid supply line 9, the conduits 6 and 7 leading to the cylinder 1 and the fluid discharge lines 10 and 11, respectively. The valve body 12 has two cylindrical collars 26, 27 which enclose an annular chamber 28 within the housing 8. Said chamber 28 forms, in dependency of the position of the valve body, a connection between the supply line 9 and the conduit 6 or between the supply line 9 and the conduit 7. Said collars 26, 27 also bound the fluid discharge chambers 29, 30 to which the discharge lines 10 and 11 are connected and which, also in dependency of the position of the valve body, connect the conduit 7 to the discharge line 11 or the conduit 6 to the discharge line 10. The control member 13 is provided with a cylindrical collar 31 operating as a piston-valve in the valve body 12. Said piston-valve 31 separates two chambers 32, 33 and cooperates with ports 34 provided in the wall of the valve-body 12 and opening in the annular chamber 28. The chambers 32 and 33 are opened and closed at the end walls of the valve body 12 by means of portions 35, 36 of the control member 13, which portions have a greater diameter than the portions of said member between the piston-valve 31 and said portions 35, 36. The ports 34 and the piston 31 serve for the alternate connection of the chambers 32, 33 to the supply line, whereas the portions 35, 36 of the control member serve for the alternate connection of said chambers to the discharge lines.

Figure 2:
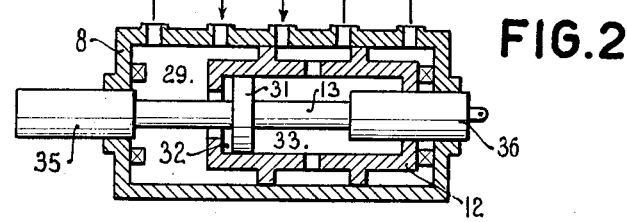

The valve device described hereabove operates as follows:

In Fig. 1 the control member 13 has just been placed in its left-hand end position by the piston. The valve body 12 is also in its left-hand end position, which is determined by abutments 37. In this position of the valve body the fluid supply line 9 is connected through the chamber 28 to the conduit 6 and the conduit 7 is connected through the discharge chamber 30 to the discharge line 11. At the same time the chamber 33 within the valve body 12 communicates through the ports 34 with the chamber 28 and the fluid supply line 9 and said chamber 33 is separated from the discharge chamber 30 by the portion 36 of the control member 13. It will be apparent that the position of the valve body 12 illustrated in Fig. 1 cannot be maintained. Due to the pressure of the fluid, that means the liquid in the chamber 33, the valve body 12 will be moved to the right-hand end position as shown in Fig. 2. Consequently, the valve body 12 is automatically reversed by the pressure of the fluid, whereby the supply line 9 becomes connected to the conduit 7 and the conduit 6 becomes connected to the discharge line 10. In this new position the valve body 12 is maintained by the fluid pressure reigning in the chamber 33. The result of the reversed position of the valve body is, that the cylinder space 5 is fed with pressure fluid and the cylinder space 4 is permitted to discharge the fluid, so that the piston 2 is driven back to its left-hand end position. Just before the piston reaches its left-hand end position the arm 20 attached to the piston-rod 3 abuts against the arm 19, whereby the control member 13 is switched over to its right-hand end position (Fig. 3). In the latter position the chamber 33 is separated from the supply line 9 but connected to the discharge chamber 13 and the chamber 32 is separated from the discharge chamber 29 but connected through the ports 34 to the supply line 9.

The effect of this new position is, that the chamber 32 of the valve body 12 is fed with pressure fluid, so that the valve body 12 is returned to the left, that means, it is placed into the position according to Fig. 4. In this last position the valve body is maintained by the pressure of the fluid until the control member 13 is switched over from the position illustrated in Fig. 4 to the position as shown in Fig. 1.

The special feature of this valve device is, that for the adjustment of the valve body the piston 2 need not have a so-called dead movement. The piston 2 moves the control member from one end position to the other when it is under full pressure and until said member has reached its end position. In that position of the control member the valve body is automatically reversed by the pressure of the fluid. Thus, the movement of the valve body is not directly connected to that of the piston any more. An apparatus provided with a valve device according to the invention is characterised by the quiet running of the piston in its cylinder and by the great simplicity of the construction of its reversing gear.

Figs. 5 and 6 show a variant of the valve device according to Figs. 1–4, inclusive. In that valve device the valve body 12a and the control member 13a are not mounted for axial movement, but they are arranged for oscillation about a shaft 38a in the housing 8a. This shaft is adapted to be swung forth and back by means of a crank 39a and a crank pen 40, which is connected to the piston 2 of the prime motor. The shaft 38a serves to move the control member from one extreme position to the other and vice versa.

In this variant the discharge chambers 29a and 30a are united to one single chamber 41a, which is provided with one discharge port 32a. The housing has a supply port 21a and working ports 22a, 23a, which are connected to the fluid supply line 9 and the conduits 6 and 7, respectively, in the manner illustrated in Fig. 1. In that case the valve body is not provided with cylindrical collars 26, 27, but with wings 26a, 27a. The control member is provided with a wing 31a instead of with a cylindrical collar 31.

The operation of this valve device is based on the same principle as that of the valve device according to Figs. 1–4. If the control member 13a is turned a little more to the left, the chamber 33a is brought into communication through the port 34a with the pressure chamber 28a, which in the illustrated position connects the working port 22a to the supply port 21a. The result of this angular displacement of the control member 13a is, that the valve body 12a is rotated to the right, whereby the connection between the supply port 21a and the working port 23a is made, whereas in that case the working port 22a is connected through the chamber 41a to the discharge port 42a. The result thereof is, that the piston of the cylinder connceted to this valve device is reversed. If thereupon the control member 13a is swung to the right, the chamber 32a will be connected through the port 34a with the pressure chamber 28a and the valve body 12a will again return to its initial position shown in Fig. 5. After the ample elucidation of the operation of the valve device illustrated in Figs. 1–4, inclusive, the embodiment according to Figs. 5 and 6 need not any further explanation.

What I claim is:

1. A valve device for automatically reversing the supply and exhaust of fluid to the ends of a cylinder containing a double-acting reciprocating piston comprising, a housing having ports therein for the admission and exhaust of working fluid to and from said housing, a valve body displaceably contained in said housing and cooperating with the ports to open and close the same, said valve body being arranged for displacement between two limiting positions within said housing by the action of said fluid, a moveable control member disposed within said valve body and defining two chambers therein, which are respectively increased and decreased in size by relative movement of said moveable member and said valve body, port means for said chambers, said port means cooperating with said moveable member for alternately and selectively connecting said chambers to the fluid admission and fluid exhaust ports of the housing, means for moving said moveable member relative to said housing and said valve body for selectively connecting one of the chambers with a fluid admission port and the other with a fluid exhaust port for increasing the size of the one chamber by the admission of working fluid and reducing the size of the other chamber by exhaust of fluid therefrom, for displacing said valve body within said housing and relative and in a direction opposite to said moveable member by the inflow of fluid increasing the size of the selected chamber, whereby the displacement of the valve body within said housing controls the admission and exhaust of the working fluid to and from said housing.

2. A valve device as claimed in claim 1, wherein a piston is provided on the control member, which is housed for reciprocation within the valve body, said valve body constituting a cylinder for said piston and said piston forming a partition between the said chambers and operating as a piston-valve for the control of the ports opening in said chambers.

3. A valve device as claimed in claim 1, wherein the valve body and the control member are mounted for rotation with respect to each other and to the housing about one and the same axis, said valve body constituting a butterfly valve, which controls the ports for the admission and the exhaust of fluid to and from said housing, and said control member being also formed as a butterfly valve, which controls the ports opening in the said chambers.

4. A valve device for automatically reversing the supply and exhaust of fluid to the ends of a cylinder containing a double-acting reciprocating piston comprising, a housing having ports therein for the admission and exhaust of working fluid to and from said housing, a valve body displaceably contained in said housing and cooperating with the ports to open and close the same, said valve body being arranged for displacement between two limiting positions within said housing by the action of said fluid, a moveable member disposed within said valve body and defining two chambers therein, which are respectively increased and decreased in size by relative movement of said moveable member and said valve body, means linking said moveable member and said reciprocating piston for displacing said moveable member relative to said housing in response to predetermined displacement of said piston, vent means for each of said chambers controlled by the positioning of said moveable member relative to the housing and to the valve body, and a port for said valve body selectively communicable with either of said chambers in accordance with the positioning of said moveable member relative to said valve body for admission of working fluid within a selected chamber of said valve body for displacing said valve body relative to and in a direction opposite said moveable member by the action of fluid entering said chamber and thereby increasing the size of said chamber and by exhausting fluid from the other chamber through said vent means and reducing the size of said other chamber, whereby said valve is displaced within said housing to control the admission and exhaust of working fluid to and from said housing.

References Cited in the file of this patent

UNITED STATES PATENTS

| | | |
|---|---|---|
| 1,125,980 | Dodds | Jan. 26, 1915 |
| 1,160,664 | Sparr et al. | Nov. 16, 1915 |
| 1,191,011 | Lewis | July 11, 1916 |
| 1,276,721 | Cartwright | Aug. 27, 1918 |
| 1,906,965 | Hobson | May 2, 1933 |